US011843963B2

(12) United States Patent
Otaka

(10) Patent No.: US 11,843,963 B2
(45) Date of Patent: Dec. 12, 2023

(54) CONTROL DEVICE, COMPUTER-READABLE STORAGE MEDIUM, AND CONTROL METHOD

(71) Applicant: HONDA MOTOR CO.,LTD., Tokyo (JP)

(72) Inventor: Masaru Otaka, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/886,813

(22) Filed: May 29, 2020

(65) Prior Publication Data

US 2020/0389807 A1  Dec. 10, 2020

(30) Foreign Application Priority Data

Jun. 5, 2019  (JP) .................................. 2019-105493

(51) Int. Cl.
*H04W 24/10* (2009.01)
*H04W 40/22* (2009.01)

(52) U.S. Cl.
CPC ........... *H04W 24/10* (2013.01); *H04W 40/22* (2013.01)

(58) Field of Classification Search
CPC ............... H04W 84/005; H04W 88/04; H04W 36/0009
See application file for complete search history.

(56) References Cited

U.S. PATENT DOCUMENTS

| 2008/0240018 | A1* | 10/2008 | Xue ................. H04W 72/1231 370/328 |
| 2011/0021221 | A1 | 1/2011 | Kondo |
| 2011/0080864 | A1* | 4/2011 | Cai ....................... H04W 36/30 370/315 |

(Continued)

FOREIGN PATENT DOCUMENTS

| CN | 106576390 A | 4/2017 |
| CN | 107113916 A | 8/2017 |

(Continued)

OTHER PUBLICATIONS

Office Action issued for counterpart Japanese Application No. 2019-105493, issued by the Japanese Patent Office dated Apr. 19, 2022 (drafted on Apr. 15, 2022).

(Continued)

*Primary Examiner* — Ernest G Tacsik

(57) ABSTRACT

A control device is provided, including: a command-signal transmitting unit that transmits, to a plurality of mobile relaying apparatuses that are movably camped on a cell of a wireless base station to relay communications between the wireless base station and a wireless communication terminal, a command signal for causing the plurality of mobile relaying apparatuses to report quality information on a communication quality of wireless communications with the wireless base station; and a selecting unit that selects a secondary cell corresponding to the wireless base station from the plurality of mobile relaying apparatuses, in response to the command signal transmitted by the com- (Continued)

mand-signal transmitting unit to the plurality of mobile relaying apparatuses, based on reporting information transmitted by the plurality of mobile relaying apparatuses.

17 Claims, 8 Drawing Sheets

(56) References Cited

U.S. PATENT DOCUMENTS

| | | | | |
|---|---|---|---|---|
| 2012/0250545 | A1* | 10/2012 | Papadogiannis | H04W 40/12 370/252 |
| 2016/0286374 | A1* | 9/2016 | Baghel | H04W 76/14 |
| 2016/0337954 | A1 | 11/2016 | Gulati | |
| 2017/0041100 | A1 | 2/2017 | Xie | |
| 2017/0111952 | A1* | 4/2017 | Choi | H04L 5/001 |
| 2017/0317740 | A1* | 11/2017 | Basu Mallick | H04W 8/005 |
| 2018/0139682 | A1* | 5/2018 | Xu | H04W 40/12 |
| 2018/0242381 | A1* | 8/2018 | Wei | H04W 40/22 |
| 2019/0281500 | A1* | 9/2019 | Cummings | H04W 16/18 |
| 2020/0068580 | A1* | 2/2020 | Tang | H04B 7/2606 |

FOREIGN PATENT DOCUMENTS

| | | |
|---|---|---|
| CN | 109246793 A | 1/2019 |
| JP | 2011029988 A | 2/2011 |
| JP | 2015180036 A | 10/2015 |
| JP | 2017502595 A | 1/2017 |
| WO | 2018173506 A1 | 9/2018 |

OTHER PUBLICATIONS

ZTE(Rapporteur), Report of email discussion [90#25][LTE/ProSe] Relay UE initiation, discovery and selection/re-selection, 3GPP TSG-RAN WG2 Meeting #91, Beijing, China, Aug. 24-28, 2015, p. 1, 4, 5, 23-25, URL:https://www.3gpp.org/ftp/tsg_ran/WG2_RL2/TSGR2_91/Docs/R2-153764.zip, accessed on Apr. 13, 2022.
Office Action issued for counterpart Chinese Application 202010456509.2, issued by the China National Intellectual Property Administration dated Aug. 15, 2022.

* cited by examiner

CONTROL DEVICE, COMPUTER-READABLE STORAGE MEDIUM, AND CONTROL METHOD

The contents of the following Japanese patent application are incorporated herein by reference: NO. 2019-105493 filed in JP on Jun. 5, 2019

BACKGROUND

1. Technical Field

The present invention relates to a control device, a computer-readable storage medium, and a control method.

2. Related Art

A mobile relaying apparatus that movably functions as a base station has been known (for example, refer to Patent Literature 1).

PRIOR ART LITERATURE

Patent Literature

[Patent Literature 1] Japanese Unexamined Patent Application Publication No. 2011-029988

DISCLOSURE OF THE INVENTION

Technical Problem

When a wireless base station provides dual connectivity to a wireless communication terminal with itself as a primary cell, it is preferable to provide a technique to be capable of selecting a mobile relaying apparatus suitable for a secondary cell.

DESCRIPTION OF EXEMPLARY EMBODIMENTS

The following describes the present invention through embodiments of the invention, and the below described embodiments do not limit the scope of the invention according to the claims. In addition, not all combinations of features described in the embodiments are necessarily essential to the solution of the invention.

Figure 1:
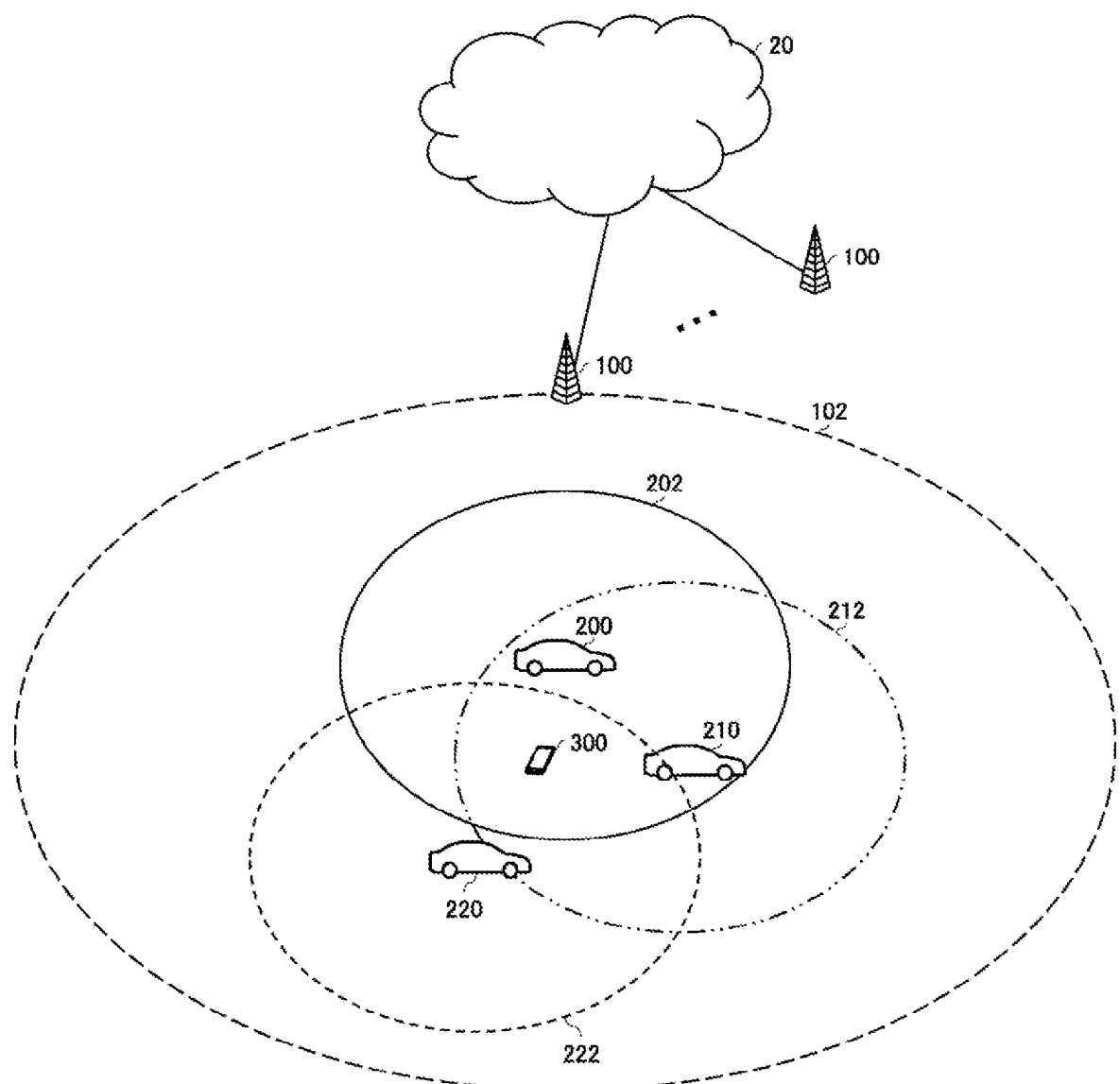
FIG. 1 schematically illustrates an example of a communication system 10.

FIG. 1 schematically illustrates an example of a communication system 10. The communication system 10 may include a wireless base station 100. The communication system 10 may include a vehicle 200. The communication system 10 may include a wireless communication terminal 300.

The vehicle 200 is camped on a cell 102 of the wireless base station 100 and has a relay function of relaying communications between the wireless base station 100 and the wireless communication terminal 300. The cell 102 indicates an area in which wireless communications with the wireless base station 100 are enabled. That the vehicle 200 is camped on the cell 102 of the wireless base station 100 may be that the vehicle 200 is located in the cell 102 of the wireless base station 100 to establish a wireless communication connection with the wireless base station 100. That the vehicle 200 is camped on the cell 102 of the wireless base station 100 may be described as that the vehicle 200 is camped on the wireless base station 100. The vehicle 200 may be an example of a mobile relaying apparatus.

The vehicle 200 may be an automobile. The vehicle 200 may be any type of automobile, as long as it has a wireless communication function. For example, the vehicle 200 may be a gasoline-fueled vehicle, or may be a so-called eco-friendly vehicle. The types of the eco-friendly vehicle include HV (Hybrid Vehicle), PHEV/PHV (Plug-in Hybrid Vehicle), EV (Electric Vehicle), FCV (Fuel Cell Vehicle), and the like. The vehicle 200 may be an automobile for any use. For example, the vehicle 200 may be a private vehicle, or may be a commercial vehicle such as a taxi and a bus.

The wireless base station 100 may be compliant with any mobile communication method. The wireless base station 100 is compliant with, for example, a 3G (3rd Generation) communication method. The wireless base station 100 is compliant with, for example, the LTE (Long Term Evolution) communication method. The wireless base station 100 may be an eNB (eNodeB). In addition, the wireless base station 100 is compliant with, for example, a 5G (5th Generation) communication method. The wireless base station 100 may be a gNB (gNodeB). The wireless base station 100 may be compliant with a mobile communication method that is a 6G (6th Generation) communication method and beyond. Herein, a case in which the wireless base station 100 is compliant with the LTE communication method is mainly described as an example.

The wireless base station 100 is connected to a network 20. The network 20 includes a mobile communication network. The network 20 may include the internet.

The wireless communication terminal 300 may be any communication terminal, as long as it has a wireless communication function. The wireless communication terminal 300 is, for example, a mobile phone such as a smartphone, a tablet terminal, a wearable terminal, a PC (Personal Computer), and the like. The wireless communication terminal 300 may also be a so-called IoT (Internet of Thing) device.

For example, the vehicle 200 generates a cell 202, and performs wireless communications with a wireless communication terminal 300 camped on the cell 202. The cell 202 indicates an area in which wireless communications with the vehicle 200 are enabled. The cell 202 may be smaller than the cell 102. That the wireless communication terminal 300 is camped on the cell 202 of the vehicle 200 may be that the wireless communication terminal 300 is located in the cell 202 and establishes a wireless communication connection with the vehicle 200. That the wireless communication terminal 300 is camped on the cell 202 of the vehicle 200 may be described as that the wireless communication terminal 300 is camped on the vehicle 200.

A communication method of wireless communications between the vehicle 200 and the wireless communication terminal 300 may be the mobile communication method. The vehicle 200 may be referred to as a mobile base station. The mobile communication method between the vehicle 200 and the wireless communication terminal 300 may be the same as the mobile communication method between the vehicle 200 and the wireless base station 100. In addition, the mobile communication method between the vehicle 200 and the wireless communication terminal 300 may be different from the mobile communication method between the vehicle 200 and the wireless base station 100.

A radio-frequency band that the vehicle 200 uses for wireless communications with the wireless communication terminal 300 may be a higher frequency band than a radio-frequency band that the wireless base station 100 uses for wireless communications with the wireless communication terminal 300. For example, the vehicle 200 can perform wireless communications with the wireless communication terminal 300 according to the 5G communication method, and the wireless base station 100 can perform wireless communication with the wireless communication terminal 300 according to the LTE communication method.

A radio-frequency band that the vehicle 200 uses for wireless communications with the wireless communication terminal 300 may be a lower frequency band than a radio-frequency band that the wireless base station 100 uses for wireless communications with the wireless communication terminal 300. For example, the vehicle 200 can perform wireless communications with the wireless communication terminal 300 according to the LTE communication method, and the wireless base station 100 can perform wireless communication with the wireless communication terminal 300 according to the 5G communication method.

In this embodiment, the wireless base station 100 can cooperate with the vehicle 200 to provide a wireless communication service to the wireless communication terminal 300. For example, the wireless base station 100 cooperates with the vehicle 200 to provide dual connectivity (which may be described as DC) to the wireless communication terminal 300. The wireless base station 100 can function as a primary cell, and the vehicle 200 can function as a secondary cell.

When the wireless base station 100 and the vehicle 200 are compliant with the LTE communication method, the wireless base station 100 may be referred to as an MeNB (Master eNB) and the vehicle 200 may be referred to as an SeNB (Secondary eNB). When the wireless base station 100 and the vehicle 200 are compliant with the 5G communication method, the wireless base station 100 may be referred to as an MgNB (Master gNB) and the vehicle 200 may be referred to as an SgNB (Secondary gNB). When the wireless base station 100 is compliant with the LTE communication method and the vehicle 200 is compliant with the 5G communication method, the wireless base station 100 may be referred to as the MeNB and the vehicle 200 may be referred to as the SgNB. When the wireless base station 100 is compliant with the 5G communication method and the vehicle 200 is compliant with the LTE communication method, the wireless base station 100 may be referred to as the MgNB and the vehicle 200 may be referred to as the SeNB.

When a plurality of vehicles 200 are located around the wireless communication terminal 300, the wireless base station 100 according to this embodiment has a function of selecting a suitable vehicle 200, from the plurality of vehicles 200, as the secondary cell in providing DC to the wireless communication terminal 300. For example, the wireless base station 100 receives, from the wireless communication terminal 300 camped on the wireless base station 100, a measurement report (which may be referred to as Measurement Report) that report a condition of a radio wave received by the wireless communication terminal 300, and transmits, to the plurality of vehicles 200 whose measurement results are included in the measurement report, a command signal for causing the vehicles 200 to report quality information on communication qualities of wireless communications with the wireless base station 100. The quality information includes, for example, information on a reception-intensity of the radio wave from the wireless base station 100.

The wireless base station 100 receives multiple pieces of reporting information transmitted by the plurality of vehicles 200 in response to the command signal the wireless base station 100 has transmitted, and selects the secondary cell from the plurality of vehicles 200 based on the multiple pieces of reporting information. The wireless base station 100 can select, as the secondary cell, a vehicle 200 whose communication quality of wireless communications with the wireless base station 100 is higher than other vehicles 200. For example, the wireless base station 100 selects, as the secondary cell, a vehicle 200 whose the reception-intensity of the radio wave from the wireless base station 100 is the highest.

Traditional views about DC are on the premise that both the primary cell and the secondary cell are stationary base stations, and the combination between the primary cell and the secondary cell is determined in advance. On the other hand, as illustrated in this embodiment, when a vehicle 200 camped on the wireless base station 100 that is the primary cell is used as a secondary cell, a communication quality of wireless communications between the wireless base station 100 and the vehicle 200 can change accordingly as the vehicle 200 moves.

For example, when a vehicle 200 is selected as a secondary cell, where the reception-intensity of the radio wave from the vehicle 200 at the wireless communication terminal 300 is the strongest, and when the reception-intensity of the radio wave from the wireless base station 100 at the vehicle 200 is weak, a communication speed between the wireless communication terminal 300 and the vehicle 200 can become high, but a communication speed between the vehicle 200 and the wireless base station 100 becomes low. As a result, a data communication speed by the wireless communication terminal 300 becomes low and a quality of experience of a user of the wireless communication terminal 300 decreases. Particularly, in an existing wireless communication terminal 300, a reception-intensity of the radio wave from the vehicle 200 is indicated, but a reception-intensity of the radio wave from the wireless base station 100 at the vehicle 200 is not indicated. As a result, the data communication speed becomes slow even if the indicated radio wave reception-intensity is strong, so that the quality of experience of the user of the wireless communication terminal 300 can become lower. On the other hand, in the wireless base station 100 according to this embodiment, a vehicle 200 whose reception-intensity of the radio wave from the wireless base station 100 is higher than those of other vehicles 200 is selected as a secondary cell, so that the occurrence of this sort of problem can be reduced.

Figure 2:
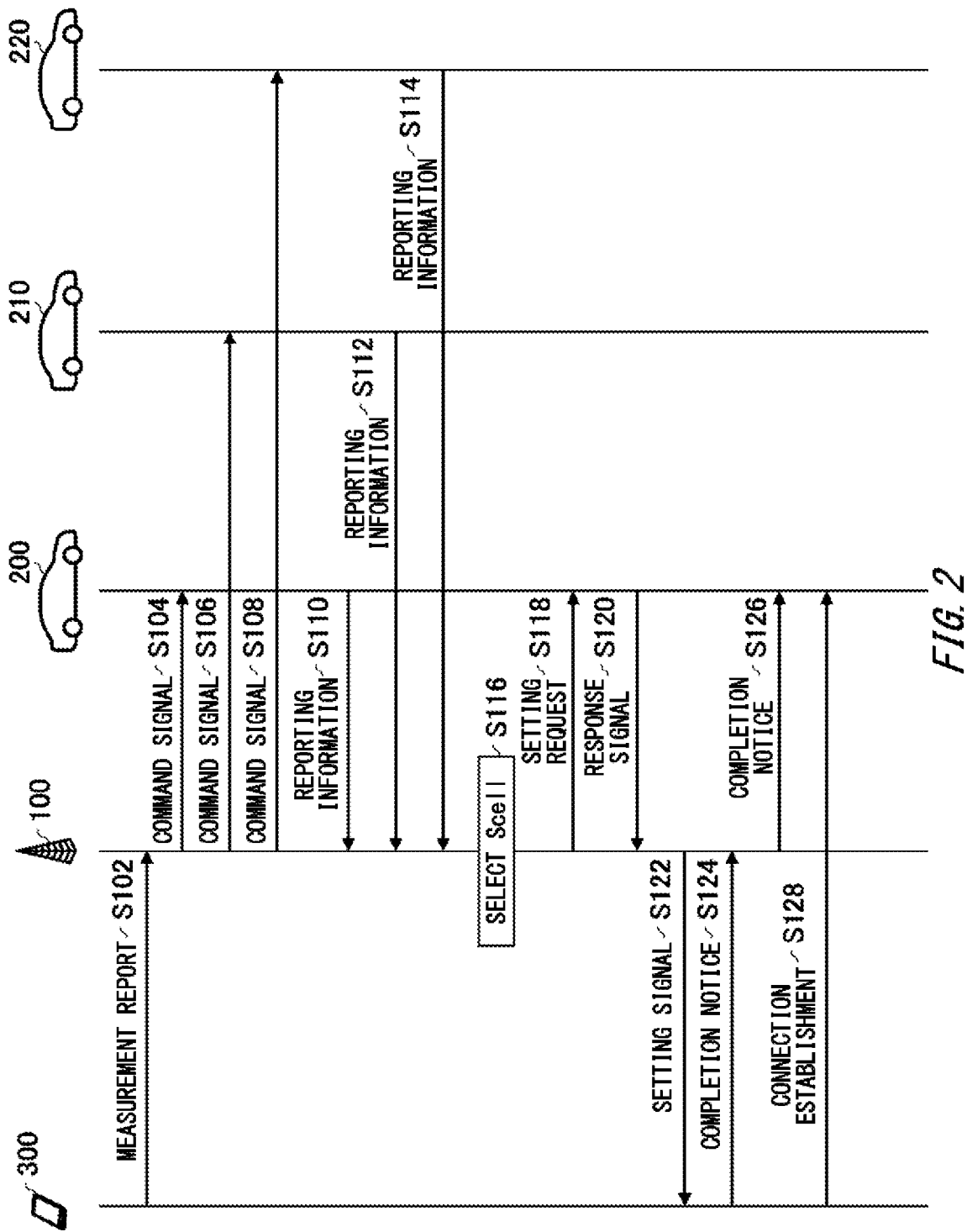
FIG. 2 schematically illustrates an example of a flow of processes performed by the communication system 10 in a situation shown in FIG. 1.

In FIG. 1, a vehicle 200, a vehicle 210, and a vehicle 220 are illustrated as examples of the plurality of vehicles 200 located around the wireless communication terminal 300. FIG. 2 schematically illustrates an example of a flow of processes performed by the communication system 10 in a situation shown in FIG. 1. Herein, a condition in which each of the wireless communication terminal 300, the vehicle 200, the vehicle 210, and the vehicle 220 is camped on the wireless base station 100 is described as a starting condition.

At step (steps may be abbreviated as "S") 102, the wireless communication terminal 300 transmits, to the wireless base station 100, a measurement report that reports a condition of a radio wave received by the wireless communication terminal 300. The measurement report includes the reception-intensity of the radio wave from the vehicle 200, the reception-intensity of the radio wave from the vehicle 210, and the reception-intensity of the radio wave from the vehicle 220.

At S104, the wireless base station 100 transmits, to the vehicle 200, a command signal for causing the vehicle 200 to report quality information on the communication quality of wireless communications with the wireless base station 100. At S106, the wireless base station 100 transmits, to the vehicle 210, a command signal for causing the vehicle 210 to report quality information on the communication quality of wireless communications with the wireless base station 100. At S108, the wireless base station 100 transmits, to the vehicle 220, a command signal for causing the vehicle 220 to report quality information on the communication quality of wireless communications with the wireless base station 100.

At S110, the vehicle 200 transmits, to the wireless base station 100, reporting information that includes quality information on the communication quality of wireless communications with the wireless base station 100, in response to the command signal received at S104. At S112, the vehicle 210 transmits, to the wireless base station 100, reporting information that includes quality information on the communication quality of wireless communications with the wireless base station 100, in response to the command signal received at S106. At S114, the vehicle 220 transmits, to the wireless base station 100, reporting information that includes quality information on the communication quality of wireless communications with the wireless base station 100, in response to the command signal received at S108.

At S116, the wireless base station 100 selects a secondary cell (which may be described as Scell) among the vehicle 200, the vehicle 210, and the vehicle 220, based on the reporting information received at S110, S112, and S114.

For example, the wireless base station 100 selects, as the Scell, a vehicle whose reception-intensity of the radio wave from the wireless base station 100 is the strongest. In this example, the wireless base station 100 selects the vehicle 200 as the Scell.

At S118, the wireless base station 100 transmits a DC-setting request to the vehicle 200. The wireless base station 100 transmits, for example, the SeNB Addition Request to the vehicle 200.

At S120, the vehicle 200 transmits, to the wireless base station 100, a response signal corresponding to the setting request received at S118. The response signal may include radio parameter information of the cell 202 of the vehicle 200. For example, the vehicle 200 transmits to the wireless base station 100, the SeNB Addition Request Acknowledgement including the radio parameter information of the cell 202.

At S122, the wireless base station 100 transmits a setting signal of a radio resource to the wireless communication terminal 300, in response to receiving the response signal at S120. For example, the wireless base station 100 transmits, to the wireless communication terminal 300, the RRC (Radio Resource Control) Connection Reconfiguration generated by using the radio parameter information included in the response signal.

At S124, the wireless communication terminal 300 transmits, to the wireless base station 100, a completion notice corresponding to the setting signal received at S122. For example, the wireless communication terminal 300 transmits, to the wireless base station 100, the RRC Connection Reconfiguration Complete.

At S126, the wireless base station 100 transmits a completion notice to the vehicle 200, in response to receiving the completion notice at S124. The wireless base station 100 transmits, for example, the SeNB Reconfiguration Complete.

At S128, synchronization establishing procedures is performed between the wireless communication terminal 300 and the vehicle 200 to establish a connection between the wireless communication terminal 300 and the vehicle 200. After S128, the wireless base station 100 provides DC to the wireless communication terminal 300 by distributing, to the vehicle 200, downlink user data to the wireless communication terminal 300 receiving, for example, from the EPC in a case of the LTE or from 5GC in a case of the 5G.

Figure 3:
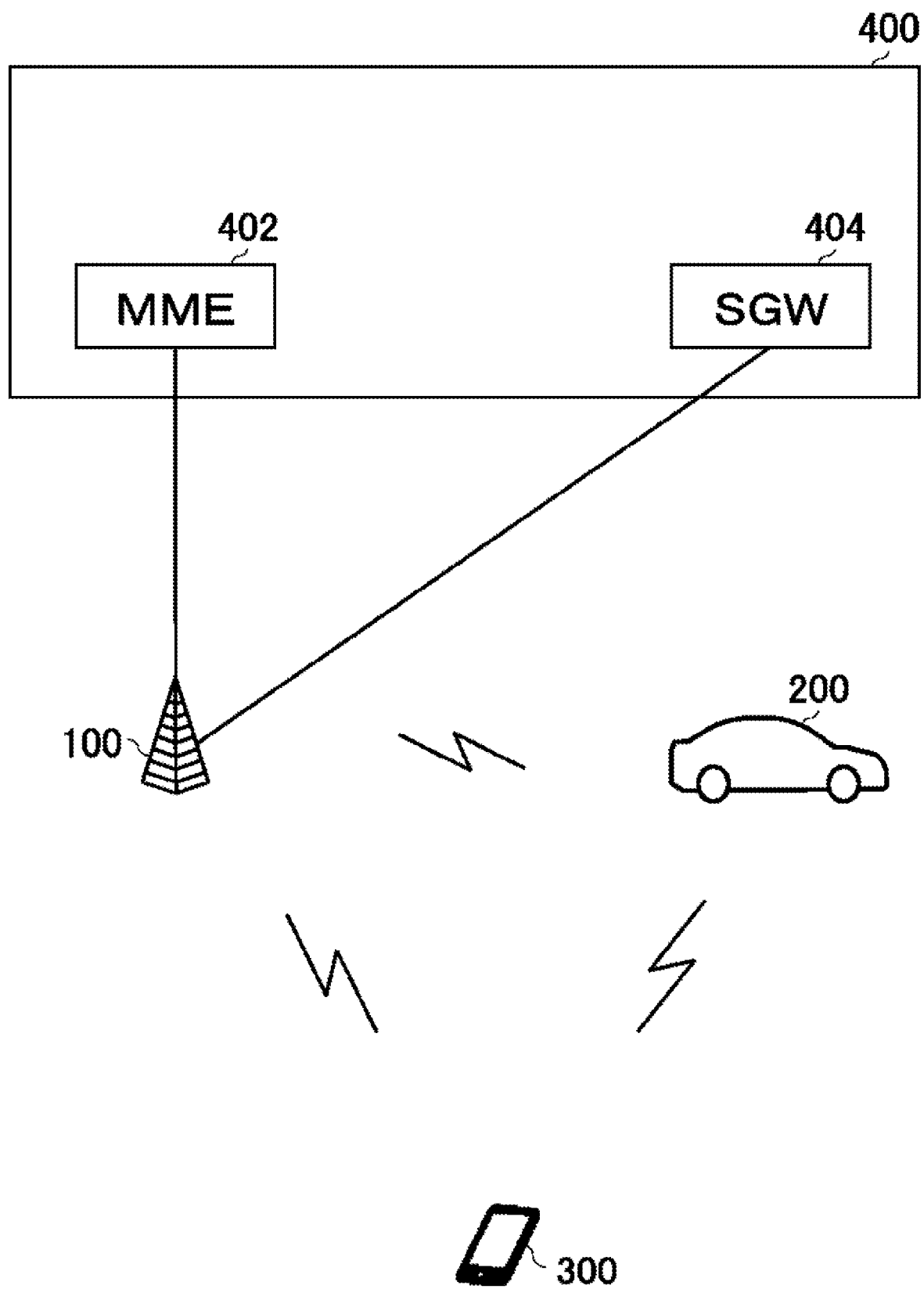
FIG. 3 is an illustration for describing the dual connectivity provided to the wireless communication terminal 300 by the wireless base station 100.

FIG. 3 is an illustration for describing DC provided to the wireless communication terminal 300 by the wireless base station 100. Herein, a case in which the wireless base station 100 selects the vehicle 200 as a secondary cell is described as an example.

In the example illustrated in FIG. 3, the wireless base station 100 is connected with an MME 402 in an EPC 400 via the S1-C interface, and connected with an SGW 404 in the EPC 400 via the S1-U interface. For the C-plane, the RRC establishment is performed only between the MME 402 and the wireless base station 100, and the controlling of vehicle 200 is performed via the wireless base station 100. The wireless base station 100 and the vehicle 200 may be connected via the X2-C interface.

For the U-plane, the wireless base station 100 distributes, to the vehicle 200, data to the wireless communication terminal 300 received from the SGW 404 via the S1-U interface. The wireless base station 100 and the vehicle 200 may be connected via the X2-U interface. The vehicle 200 transmits, to the wireless communication terminal 300, data distributed from the wireless base station 100.

Note that the configuration illustrated in FIG. 3 is merely an example, and another configuration may be adopted. For example, the interfaces used connections between respective components are not limited to the interfaces described above, and other interfaces may be adopted. In addition, for example, when the vehicle 200 and the SGW 404 are capable of communicating in different paths, data to the wireless communication terminal 300 may be transmitted from the SGW 404 to the vehicle 200 without the wireless base station 100.

Figure 4:
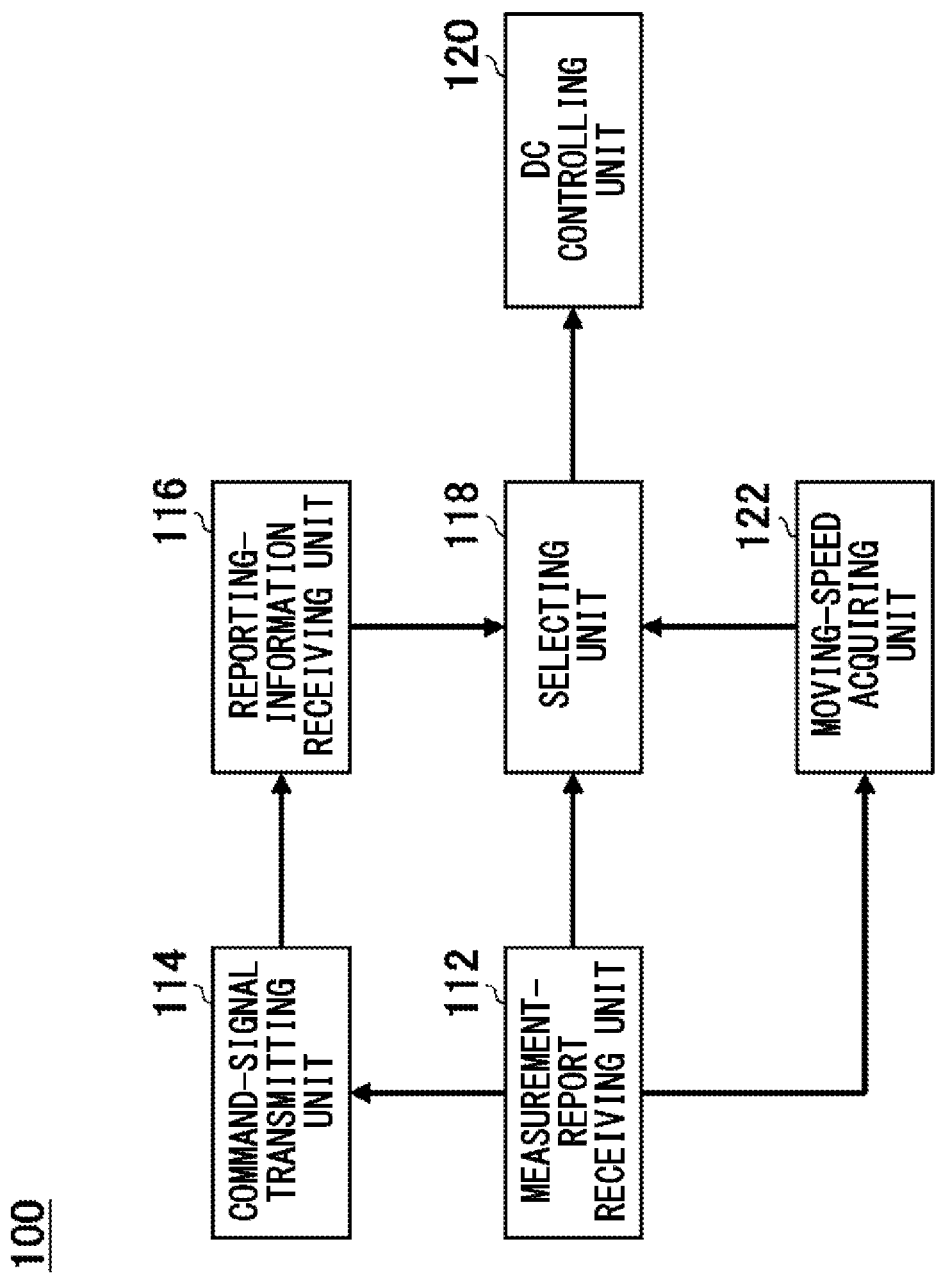
FIG. 4 schematically illustrates an example of a functional configuration of the wireless base station 100.

FIG. 4 schematically illustrates an example of a functional configuration of the wireless base station 100. The wireless base station 100 includes a measurement-report receiving unit 112, a command-signal transmitting unit 114, a reporting-information receiving unit 116, a selecting unit 118, a DC controlling unit 120, and a moving-speed acquiring unit 122. Note that the wireless base station 100 is not necessarily required to include all of these components.

The measurement-report receiving unit 112 receives, from the wireless communication terminal 300 that already establishes a wireless communication connection, a measurement report that reports a condition of a radio wave received by the wireless communication terminal 300. The measurement report may be a so-called "Measurement Report".

The command-signal transmitting unit 114 transmits, to one or more vehicles 200 whose measurement results are included in the measurement report received by the measurement-report receiving unit 112, command signals for causing the one or more vehicles 200 to report quality information on the communication quality of wireless communications with the wireless base station 100. The quality information includes, for example, information on a reception-intensity of the radio wave from the wireless base station 100. The quality information may include information on a communication speed between the wireless base station 100 and the vehicle 200.

The reporting-information receiving unit 116 receives, in response to the command signal transmitted by the command-signal transmitting unit 114, the reporting information transmitted by the vehicle 200. The reporting-information receiving unit 116 can receive, in response to the command signals transmitted by the command-signal transmitting unit 114 to a plurality of vehicles 200, the reporting information transmitted by the plurality of vehicles 200.

The selecting unit 118 selects a secondary cell corresponding to the wireless communication terminal 300 in a case that the wireless base station 100 provides, as a primary cell, DC to the wireless communication terminal 300. When the measurement report received by the measurement-report receiving unit 112 includes only a measurement result of one vehicle 200 and the reception-intensity of the radio wave from the vehicle 200 at the wireless communication terminal 300 is stronger than a predetermined intensity, the selecting unit 118 may select the vehicle 200 as a secondary cell.

When the measurement report received by the measurement-report receiving unit 112 includes measurement results of a plurality of vehicles 200, the selecting unit 118 selects a secondary cell from the plurality of vehicles 200 based on multiple pieces of reporting information received by the reporting-information receiving unit 116.

The selecting unit 118 selects, as a secondary cell, for example, a vehicle 200 whose communication quality of wireless communications with the wireless base station 100 is higher than other vehicles 200 among the plurality of vehicles 200. More specifically, the selecting unit 118 selects, as a secondary cell, a vehicle 200 whose communication quality of wireless communications with the wireless base station 100 is the highest among the plurality of vehicles 200.

When the quality information includes information on a reception-intensity of the radio wave from the wireless base station 100, the selecting unit 118 may select, as a secondary cell, a vehicle 200 whose reception-intensity of the radio wave from the wireless base station 100 is stronger than other vehicles 200 among the plurality of vehicles 200. For example, the selecting unit 118 selects, a secondary cell, a vehicle 200 whose reception-intensity of the radio wave from the wireless base station 100 is the strongest among the plurality of vehicles 200.

The selecting unit 118 may select a secondary cell from the plurality of vehicles 200, based on the measurement report received by the measurement-report receiving unit 112 and multiple pieces of reporting information received by the reporting-information receiving unit 116. The selecting unit 118 selects, as a secondary cell, for example, a vehicle 200 whose communication quality of wireless communications with the wireless communication terminal 300 is higher, in vehicles 200 whose communication qualities of wireless communications with the wireless base station 100 are higher than a predetermined quality among the plurality of vehicles 200. More specifically, the selecting unit 118 selects, as a secondary cell, a vehicle 200 whose communication quality of wireless communications with the wireless communication terminal 300 is the highest, in vehicles 200 whose communication qualities of wireless communications with the wireless base station 100 are higher than a predetermined quality among the plurality of vehicles 200.

When the quality information includes information on a reception-intensity of the radio wave from the wireless base station 100, the selecting unit 118 may select, as a secondary cell, a vehicle 200 whose reception-intensity of the radio wave from the vehicles 200 by the wireless communication terminal 300 is stronger, in vehicles 200 whose reception-intensities of the radio waves from the wireless base station 100 are stronger than a predetermined intensity among the plurality of vehicles 200. More specifically, the selecting unit 118 selects, as a secondary cell, a vehicle 200 whose reception-intensity of the radio wave from the vehicle 200 by the wireless communication terminal 300 is the strongest, in vehicles 200 whose reception-intensities of the radio waves from the wireless base station 100 are stronger than a predetermined intensity among the plurality of vehicles 200.

The DC controlling unit 120 performs control such that a vehicle 200 selected by the selecting unit 118 provides, as a secondary cell, DC to the wireless communication terminal 300. The DC controlling unit 120 registers the vehicle 200 selected by the selecting unit 118, as a secondary cell.

The DC controlling unit 120 transmits a DC setting request to the vehicle 200. The DC controlling unit 120 receives a response signal corresponding to the DC setting request, transmitted by the vehicle 200. The response signal includes radio parameter information and the like of the cell 202 of the vehicle 200. The DC controlling unit 120 transmits a setting signal of the radio resource to the wireless communication terminal 300, in response to receiving the response signal from the vehicle 200. The DC controlling unit 120 receives a completion notice corresponding to the setting signal, transmitted by the vehicle 200. The DC controlling unit 120 transmits a completion notice to the vehicle 200, in response to receiving a completion notice. After transmitting the completion notice, the DC controlling unit 120 distributes, to the vehicle 200, data to the wireless communication terminal 300 received from the SGW 404.

The moving-speed acquiring unit 122 acquires a moving speed of the vehicle 200 camped on the wireless base station 100. The moving-speed acquiring unit 122 may receive information of the moving speed of the vehicle 200 from the vehicle 200. For example, the command-signal transmitting unit 114 transmits a command signal including moving speed request information to request information of the moving speed to one or more vehicles 200 whose measurement results are included in the measurement reports received by the measurement-report receiving unit 112, and the reporting-information receiving unit 116 receives reporting information including a moving speed. The moving-speed acquiring unit 122 may acquire the moving speed from the reporting information.

The selecting unit 118 may select a secondary cell from a plurality of vehicles 200, based on multiple pieces of reporting information received by the reporting-information receiving unit 116 and a plurality of moving speeds acquired by the moving-speed acquiring unit 122. The selecting unit 118 selects, as a secondary cell, a vehicle 200 whose moving speed is slower than other vehicles 200, for example, in vehicles 200 whose communication qualities of wireless communications with the wireless base station 100 are higher than a predetermined quality among the plurality of vehicles 200. More specifically, the selecting unit 118 selects, as a secondary cell, a vehicle 200 whose moving speed is the slowest, in vehicles 200 whose communication qualities of wireless communications with the wireless base station 100 are higher than the predetermined quality among the plurality of vehicles 200. This enables a vehicle 200, whose communication quality of wireless communications with the wireless base station 100 is above a certain level and which is capable of achieving stable communications compared with a case of the moving speed being faster, to be selected as a secondary cell.

When the quality information includes information on a reception-intensity of the radio wave from the wireless base station 100, the selecting unit 118 selects, as a secondary cell, a vehicle 200 whose moving speed is slower than other vehicles 200, in vehicles 200 whose reception-intensities of the radio waves from the wireless base station 100 are stronger than the predetermined intensity among the plurality of vehicles 200. More specifically, the selecting unit 118 selects, as a secondary cell, a vehicle 200 whose moving speed is the slowest, in vehicles 200 whose reception-intensities of the radio waves from the wireless base station 100 are stronger than the predetermined intensity among the plurality of vehicles 200.

The selecting unit 118 may select a secondary cell from the plurality of vehicles 200, based on the measurement report received by the measurement-report receiving unit 112 and multiple pieces of reporting information received by the reporting-information receiving unit 116, and a plurality of moving speeds acquired by the moving-speed acquiring unit 122. The selecting unit 118 selects, as secondary cell, a vehicle 200 whose moving speed is slower than other vehicles 200, for example, in a plurality of vehicles 200 whose communication qualities of wireless communications with the wireless base station 100 are higher than the predetermined quality and whose reception-intensities of the radio waves from the vehicle 200 at the wireless communication terminal 300 are stronger than the predetermined intensity, among the plurality of vehicles 200. More specifically, the selecting unit 118 selects, as a secondary cell, a vehicle 200 whose moving speed is the slowest, in a plurality of vehicles 200 whose communication qualities of wireless communications with the wireless base station 100 are higher than the predetermined quality and whose reception-intensities of the radio waves from the vehicle 200 at wireless communication terminal 300 are stronger than the predetermined intensity, among the plurality of vehicles 200.

In addition, the selecting unit 118 selects, as a secondary cell, a vehicle 200 whose reception-intensity of the radio wave from the vehicle 200 at the wireless communication terminal 300 is stronger than other vehicles 200, in a plurality of vehicles 200 whose communication qualities of wireless communications with the wireless base station 100 are higher than the predetermined quality and whose moving speeds are slower than the predetermined speed, among the plurality of vehicles 200, for example. More specifically, the selecting unit 118 selects, as a secondary cell, a vehicle 200 whose reception-intensity of the radio wave from the vehicle 200 at the wireless communication terminal 300 is the strongest, in a plurality of vehicles 200 whose communication qualities of wireless communications with the wireless base station 100 are higher than the predetermined quality and whose moving speeds are slower than the predetermined speed, among the plurality of vehicles 200.

The predetermined intensity described above may be arbitrarily configurable, or may be changeable. The predetermined quality described above may be arbitrarily configurable, or may be changeable. The predetermined speed described above may be arbitrarily configurable, or may be changeable.

Figure 5:
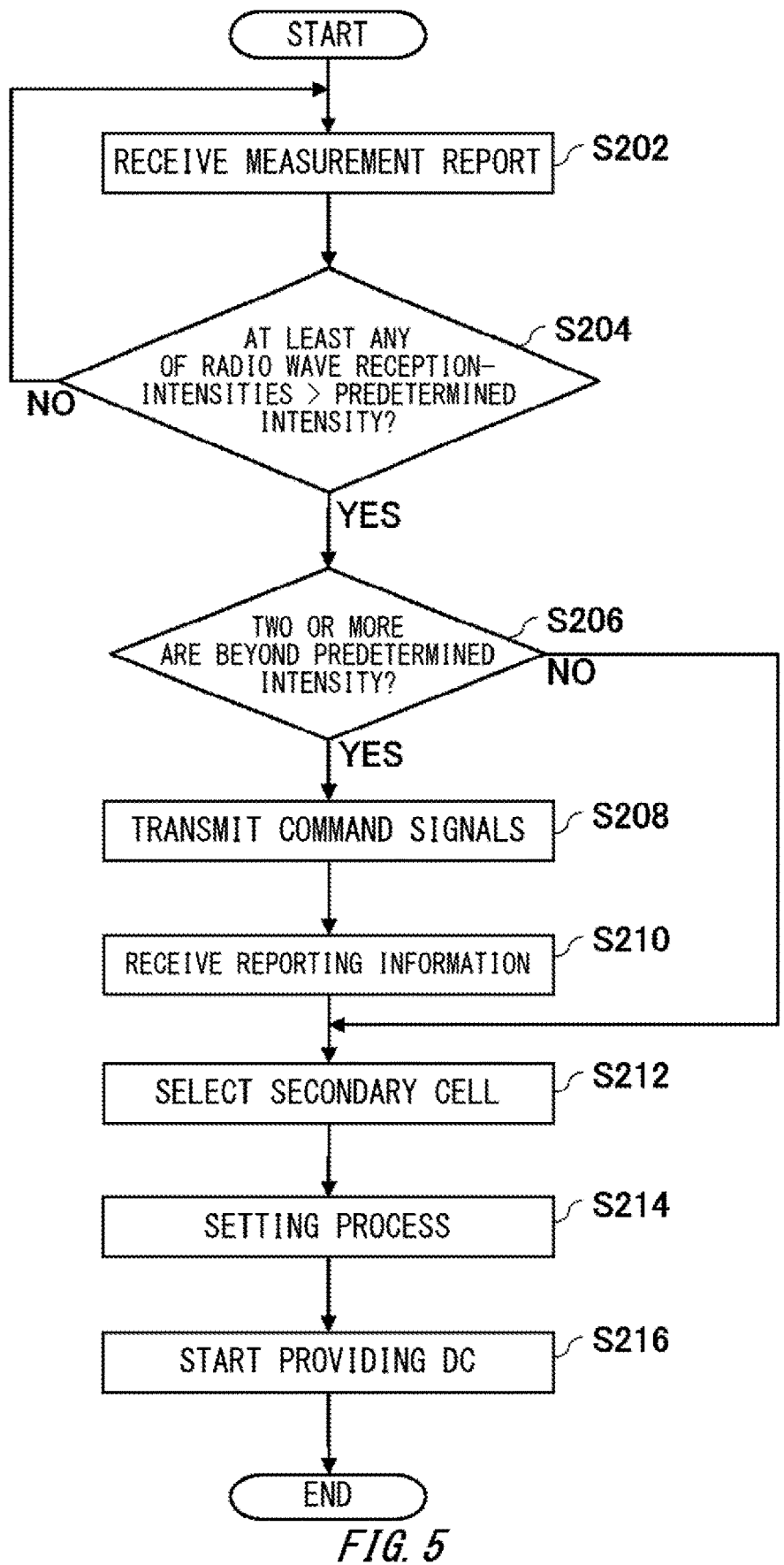
FIG. 5 schematically illustrates an example of a flow of processes performed by the wireless base station 100.

FIG. 5 schematically illustrates an example of a flow of processes performed by the wireless base station 100. Herein, a situation in which the wireless communication terminal 300 and a plurality of vehicles 200 are camped on the wireless base station 100 is a starting condition, and an example of a flow of processes is described until DC to the wireless communication terminal 300 starts to be provided.

At 202, the measurement-report receiving unit 112 receives a measurement report from the wireless communication terminal 300. At 204, the measurement-report receiving unit 112 determines whether at least any of one or more radio wave reception-intensities included in the measurement report is stronger than the predetermined intensity. If no, return to S202, or if yes, proceed to S206.

At S206, the measurement-report receiving unit 112 determines whether the number of vehicles 200 whose radio wave reception-intensities are stronger than the predetermined intensity are plural. If yes, proceed to S208, or if no, proceed to S212.

At S208, the command-signal transmitting unit 114 transmits command signals to the plurality of vehicles 200 whose radio wave reception-intensities are stronger than the predetermined intensity. At S210, the reporting-information receiving unit 116 receives reporting information transmitted by each of the plurality of vehicles 200, in response to the command signals transmitted by the command-signal transmitting unit 114 at S208.

At S212, the selecting unit 118 selects a secondary cell. When it is determined at S206 that the number of vehicles 200 whose radio wave reception-intensities are stronger than the predetermined intensity is not plural, the selecting unit 118 selects one vehicle 200 whose radio wave reception-intensity is stronger than the predetermined intensity, as a secondary cell. When it is determined at S206 that the number of vehicles 200 whose radio wave reception-intensities are stronger than the predetermined intensity is plural, the selecting unit 118 selects a secondary cell among the plurality of vehicles 200.

The selecting unit 118 may select a secondary cell among the plurality of vehicles 200, based on the reporting information received at S210. The selecting unit 118 may select a secondary cell among the plurality of vehicles 200, further based on the measurement report received at S202. When the reporting information received at S210 includes a moving speed of the vehicle 200, the selecting unit 118 may select a secondary cell among the plurality of vehicles 200, further based on the moving speed.

At S214, the DC controlling unit 120 registers, as a secondary cell, the vehicle 200 selected by the selecting unit 118 at S212 to perform a setting process. At S216, the DC controlling unit 120 starts providing DC to the wireless communication terminal 300, along with the vehicle 200 in which the setting process is complete at S214.

Figure 6:
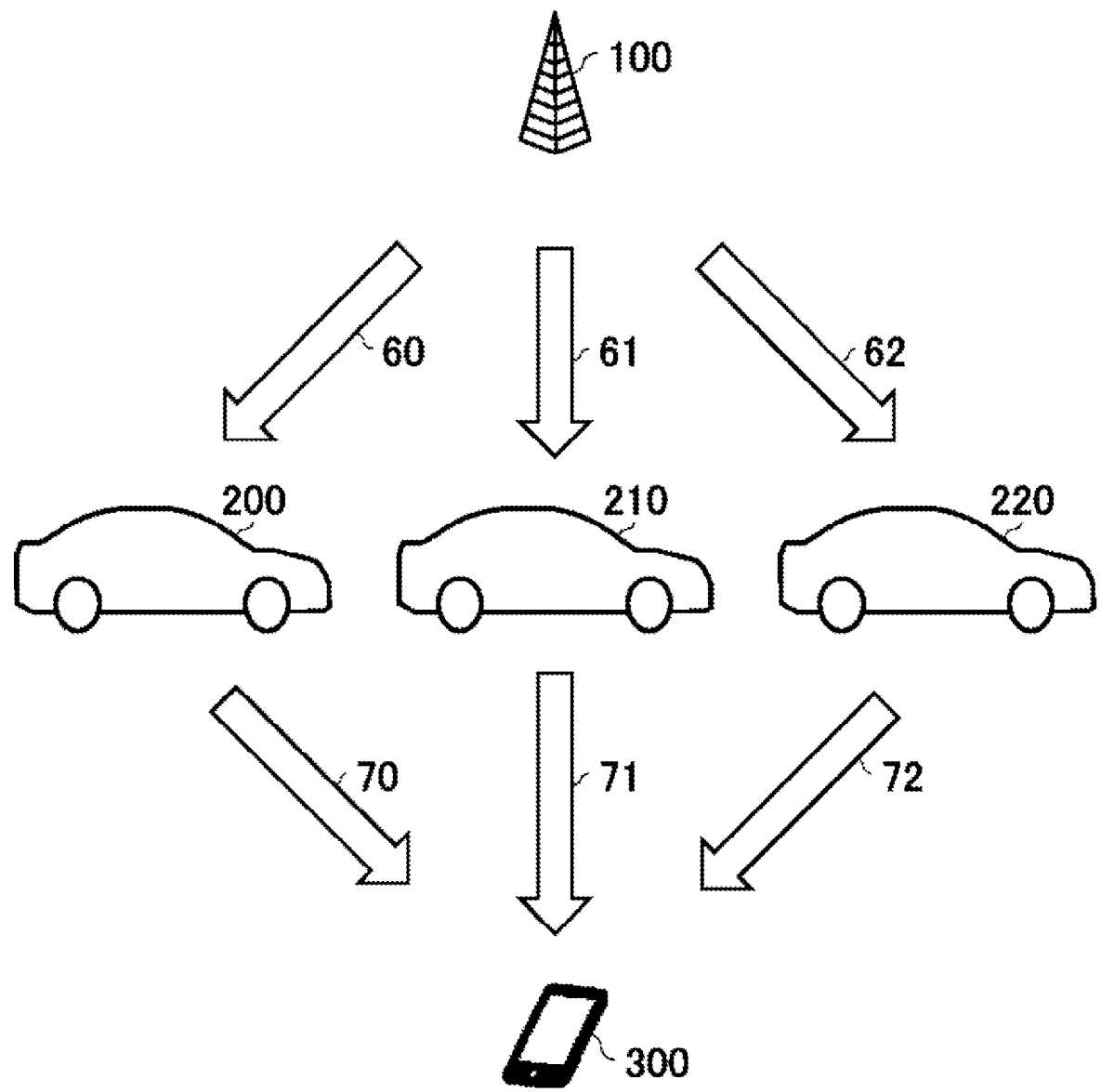
FIG. 6 is an illustration for describing a selection process performed by the wireless base station 100.

FIG. 6 is an illustration for describing a selection process performed by the wireless base station 100. Intensity 60 indicates a reception-intensity of a radio wave from the wireless base station 100 at the vehicle 200. Intensity 61 indicates a reception-intensity of a radio wave from the wireless base station 100 at the vehicle 210. Intensity 62 indicates a reception-intensity of a radio wave from the wireless base station 100 at the vehicle 220. Intensity 70 indicates a reception-intensity of a radio wave from the vehicle 200 at wireless communication terminal 300. Intensity 71 indicates a reception-intensity of a radio wave from the vehicle 210 at wireless communication terminal 300. Intensity 72 indicates a reception-intensity of a radio wave from the vehicle 220 at wireless communication terminal 300.

Table 1 below shows an example of respective intensities. For the intensity 60, the intensity 61, and the intensity 62, "strong" is shown in a case that the intensity is stronger than a first intensity, "medium" is shown in a case that the intensity is between the first intensity and a second intensity (which is weaker than the first intensity), and "weak" is shown in a case that the intensity is weaker than the second intensity. Similarly, for the intensity 70, the intensity 71, and the intensity 72, "strong" is shown in a case that the intensity is stronger than a third intensity, "medium" is shown in a case that the intensity is between the third intensity and a fourth intensity (which is weaker than the third intensity), and "weak" is shown in a case that the intensity is weaker than the fourth intensity. When the situation is as shown in Table 1, the selecting unit 118 can select the vehicle 200 as a secondary cell, because the intensity 60 is stronger than the intensity 61 and the intensity 62.

TABLE 1

|  | VEHICLE 200 | VEHICLE 210 | VEHICLE 220 |
| --- | --- | --- | --- |
| RADIO WAVE RECEIVING-INTENSITY FROM WIRELESS BASE STATION 100 | INTENSITY 60: STRONG | INTENSITY 61: WEAK | INTENSITY 62: MEDIUM |
| RADIO WAVE RECEIVING-INTENSITY AT WIRELESS COMMUNICATION TERMINAL 300 | INTENSITY 70: WEAK | INTENSITY 71: MEDIUM | INTENSITY 72: WEAK |

Table 2 below shows another example of respective intensities. When the situation is as shown in Table 2, the selecting unit 118 first selects the vehicle 200 and the vehicle 210 as candidates, because the intensity 60 is stronger than the intensity 61 and the intensity 62. Then, the selecting unit 118 can select the vehicle 200 as a secondary cell, because the intensity 70 is stronger than the intensity 71.

TABLE 2

|  | VEHICLE 200 | VEHICLE 210 | VEHICLE 220 |
| --- | --- | --- | --- |
| RADIO WAVE RECEIVING-INTENSITY FROM WIRELESS BASE STATION 100 | INTENSITY 60: STRONG | INTENSITY 61: STRONG | INTENSITY 62: WEAK |
| RADIO WAVE RECEIVING-INTENSITY AT WIRELESS COMMUNICATION TERMINAL 300 | INTENSITY 70: MEDIUM | INTENSITY 71: WEAK | INTENSITY 72: WEAK |

Table 3 below shows another example of respective intensities, and an example of moving speeds of the vehicle 200, the vehicle 210, and the vehicle 220. When the situation is as shown in Table 3, the selecting unit 118 can select the vehicle 200 whose moving speed is the slowest as a secondary cell, because the intensity 60, the intensity 61, and the intensity 62 are equivalent and the intensity 70, the intensity 71, and the intensity 72 are equivalent.

TABLE 3

| | VEHICLE 200 | VEHICLE 210 | VEHICLE 220 |
|---|---|---|---|
| RADIO WAVE RECEIVING-INTENSITY FROM WIRELESS BASE STATION 100 | INTENSITY 60: STRONG | INTENSITY 61: STRONG | INTENSITY 62: STRONG |
| RADIO WAVE RECEIVING-INTENSITY AT WIRELESS COMMUNICATION TERMINAL 300 | INTENSITY 70: STRONG | INTENSITY 71: STRONG | INTENSITY 72: STRONG |
| MOVING SPEED | SLOW | MEDIUM | FAST |

In the above embodiment, the process of selecting a secondary cell is described exemplifying a case in which the wireless base station 100 performs the process, but is not limited thereto. The process of selecting a secondary cell may be performed by another device in the core network. For example, when the wireless base station 100 is compliant with the LTE communication method, the process of selecting a secondary cell is performed by the EPC 400. In this case, the EPC 400 is an example of a control device. In addition, the process of selecting a secondary cell is performed by, for example, the MME 402. In this case, the MME 402 is an example of the control device. In addition, when the wireless base station 100 is compliant with, for example, the 5G communication method, the process of selecting a secondary cell is performed by the 5GC. In this case, the 5GC is an example of the control device.

Figure 7:
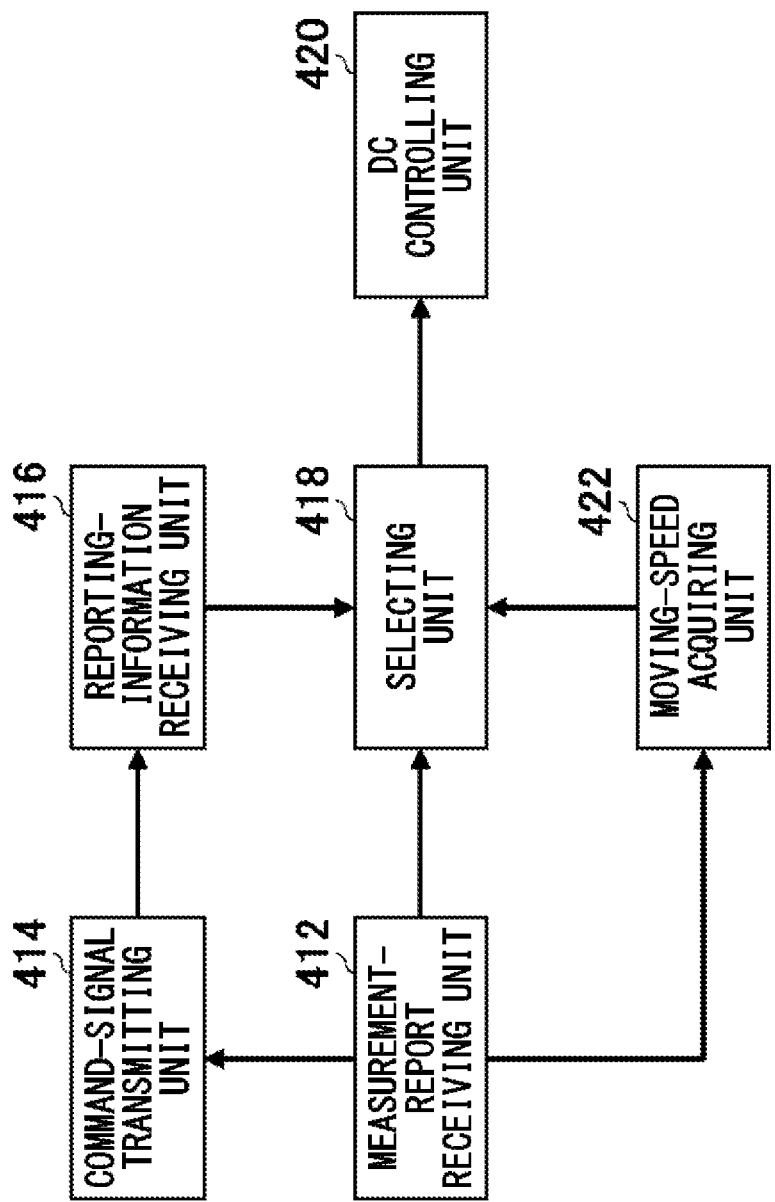
FIG. 7 schematically illustrates an example of a functional configuration of an EPC 400.

FIG. 7 schematically illustrates an example of a functional configuration of the EPC 400 or the MME 402 in a case that the wireless base station 100 is compliant with the LTE communication method. When the wireless base station 100 is compliant with the 5G, the 5GC may be applied. The EPC 400, the MME 402, or the 5GC includes a measurement-report receiving unit 412, a command-signal transmitting unit 414, a reporting-information receiving unit 416, a selecting unit 418, a DC controlling unit 420, and a moving-speed acquiring unit 422. Note that each of the devices is not necessarily required to include all of these components. Herein, different points from the measurement-report receiving unit 112, the command-signal transmitting unit 114, the reporting-information receiving unit 116, the selecting unit 118, the DC controlling unit 120, and the moving-speed acquiring unit 122 are mainly described.

The measurement-report receiving unit 412 receives, from the wireless base station 100, a measurement report that the wireless base station 100 has received from the wireless communication terminal 300, which already establishes a wireless communication connection with the wireless base station 100. The command-signal transmitting unit 414 transmits, to one or more vehicles 200 whose measurement results are included in the measurement report received by the measurement-report receiving unit 412 via the wireless base station 100, command signals for causing the one or more vehicles 200 to report quality information on the communication quality of wireless communications with the wireless base station 100. In response to the command signal transmitted by the command-signal transmitting unit 414, the reporting-information receiving unit 416 receives, from the wireless base station 100, the reporting information transmitted by the vehicle 200 to the wireless base station 100.

The selecting unit 418 selects a secondary cell corresponding to the wireless communication terminal 300 in a case that the wireless base station 100 provides, as a primary cell, DC to the wireless communication terminal 300. The selection method of a secondary cell in the selecting unit 418 may be similar to the method in the selecting unit 118.

The DC controlling unit 420 performs control such that the wireless base station 100 registers, as a secondary cell corresponding to the wireless base station 100, a vehicle 200 selected by the selecting unit 418, in a case that the wireless base station 100 provides, as a primary cell, DC to the wireless communication terminal 300. The DC controlling unit 420 causes the wireless base station 100 to register, in the wireless base station 100 as a secondary cell, the vehicle 200 selected by the selecting unit 418.

The moving-speed acquiring unit 422 acquires, from the wireless base station 100, a moving speed of the vehicle 200 camped on the wireless base station 100. The selecting unit 418 may select a secondary cell from a plurality of vehicles 200, based on multiple pieces of reporting information received by the reporting-information receiving unit 416 and a plurality of moving speeds acquired by the moving-speed acquiring unit 422. The selecting unit 418 may select a secondary cell from the plurality of vehicles 200, based on the measurement report received by the measurement-report receiving unit 412 and multiple pieces of reporting information received by the reporting-information receiving unit 416, and a plurality of moving speeds acquired by the moving-speed acquiring unit 422.

Figure 8:
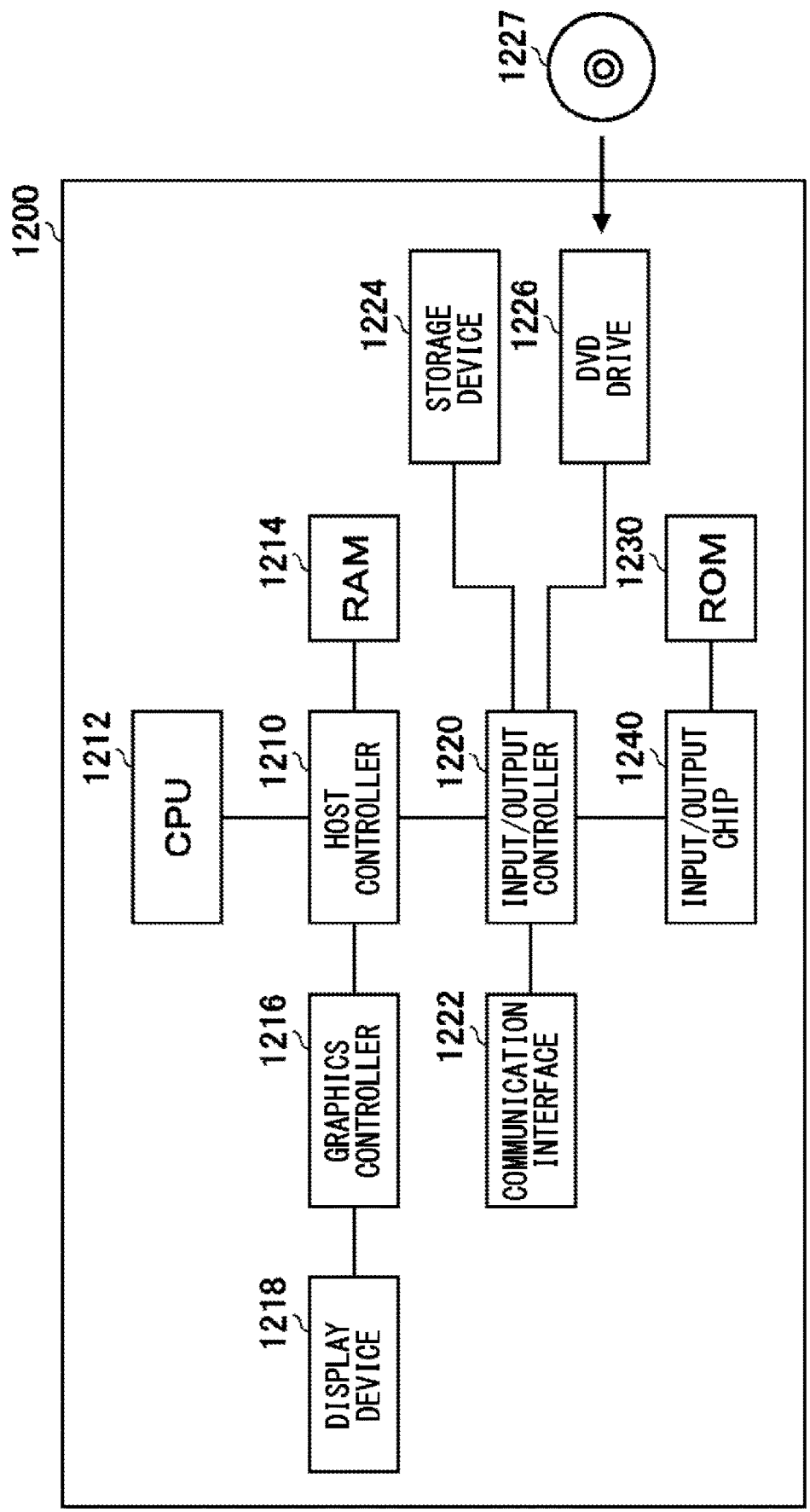
FIG. 8 schematically illustrates an example of a hardware configuration of a computer 1200 functioning as the wireless base station 100, the EPC 400 or an MME 402.

FIG. 8 schematically illustrates an example of a hardware configuration of a computer 1200 functioning as the wireless base station 100, the EPC 400 or the MME 402. A program installed in the computer 1200 can cause the computer 1200 to function as one or more "units" of an apparatus according to the above embodiments, or can cause the computer 1200 to perform operations associated with the apparatus according to the above embodiments or perform the one or more "units", and/or can cause the computer 1200 to perform processes according to the above embodiments or steps of the processes. Such a program may be executed by a CPU 1212, in order to cause the computer 1200 to perform specific operations associated with some or all of blocks of flow charts and block diagrams set forth herein.

The computer 1200 according to this embodiment includes the CPU 1212, a RAM 1214, and a graphics controller 1216, which are interconnected by a host controller 1210. The computer 1200 also includes a communication interface 1222, a storage device 1224, a DVD drive 1226, and an input/output unit such as an IC card drive, which are connected to the host controller 1210 via an input/output controller 1220. The DVD drive 1226 may be a DVD-ROM drive, a DVD-RAM drive, and the like. The storage device 1224 may be a hard disk drive, a solid-state drive, and the like. The computer 1200 may also include a ROM 1230 and a legacy input/output unit such as a touch panel, which are connected to the input/output controller 1220 via the input/output chip 1240.

The CPU 1212 operates according to programs stored in the ROM 1230 and the RAM 1214, thereby controlling each unit. The graphics controller 1216 acquires image data generated by the CPU 1212 on a frame buffer or the like provided in the RAM 1214 or in itself, and causes the image data to be displayed on a display device 1218. The computer 1200 may not include the display device 1218, in which case the graphics controller 1216 causes the image data to be displayed on an external display device.

The communication interface 1222 communicates with other electronic devices via a wireless communication network. The storage device 1224 stores programs and data used by the CPU 1212 within the computer 1200. The DVD drive 1226 reads the programs or the data from the DVD-ROM 1227 or the like, and provides the storage device 1224 with the programs or the data. The IC card drive reads programs and data from an IC card, and/or writes programs and data into the IC card.

The ROM 1230 stores therein a boot program or the like executed by the computer 1200 at the time of activation, and/or a program depending on the hardware of the computer 1200. The input/output chip 1240 may also connect various input/output units via a USB port and the like to the input/output controller 1220.

A program is provided by a computer-readable storage medium such as the DVD-ROM 1227 or the IC card. The program is read from the computer-readable storage medium, installed onto the storage device 1224, RAM 1214, or ROM 1230, which are also examples of the computer-readable storage medium, and executed by the CPU 1212. The information processing described in these programs is read into the computer 1200, resulting in cooperation between a program and the above-mentioned various types of hardware resources. An apparatus or method may be constituted by realizing the operation or processing of information in accordance with the use of the computer 1200.

For example, when communication is performed between the computer 1200 and an external device, the CPU 1212 may execute a communication program loaded onto the RAM 1214 to instruct communication processing to the communication interface 1222, based on the processing described in the communication program. The communication interface 1222, under control of the CPU 1212, reads transmission data stored on a transmission buffer region provided in a recording medium such as the RAM 1214, the storage device 1224, the DVD-ROM 1227, or the IC card, and transmits the read transmission data to a network or writes reception data received from a network to a reception buffer region or the like provided on the recording medium.

In addition, the CPU 1212 may cause all or a necessary portion of a file or a database to be read into the RAM 1214, the file or the database having been stored in an external recording medium such as the storage device 1224, the DVD drive 1226 (DVD-ROM 1227), the IC card, etc., and perform various types of processing on the data on the RAM 1214. The CPU 1212 may then write back the processed data to the external recording medium.

Various types of information, such as various types of programs, data, tables, and databases, may be stored in the recording medium to undergo information processing. The CPU 1212 may perform various types of processing on the data read from the RAM 1214, which includes various types of operations, processing of information, condition judging, conditional branch, unconditional branch, search/replacement of information, etc., as described throughout this disclosure and specified by an instruction sequence of programs, and writes the result back to the RAM 1214. In addition, the CPU 1212 may search for information in a file, a database, etc., in the recording medium. For example, when a plurality of entries, each having an attribute value of a first attribute associated with an attribute value of a second attribute, are stored in the recording medium, the CPU 1212 may search for an entry matching the condition whose attribute value of the first attribute is specified, from among the plurality of entries, and read the attribute value of the second attribute stored in the entry, thereby acquiring the attribute value of the second attribute associated with the first attribute satisfying the predetermined condition.

The above-explained program or software modules may be stored in the computer-readable storage medium on or near the computer 1200. In addition, a recording medium such as a hard disk or a RAM provided in a server system connected to a dedicated communication network or the Internet can be used as the computer-readable storage medium, thereby providing the program to the computer 1200 via the network.

Blocks in flow charts and block diagrams in the above embodiments may represent steps of processes in which operations are performed or units of apparatuses responsible for performing operations. Specific steps and units may be implemented by dedicated circuitry, programmable circuitry supplied with computer-readable instructions stored on the computer-readable storage medium, and/or processors supplied with computer-readable instructions stored on the computer-readable storage medium. Dedicated circuitry may include digital and/or analog hardware circuits and may include integrated circuits (IC) and/or discrete circuits. Programmable circuitry may include, for example, reconfigurable hardware circuits comprising logical AND, OR, XOR, NAND, NOR, and other logical operations, flip-flops, registers, and memory elements, such as field-programmable gate arrays (FPGA), programmable logic arrays (PLA), and the like.

The computer-readable storage medium may include any tangible device that can store instructions for execution by a suitable device, such that the computer-readable storage medium having instructions stored therein comprises an article of manufacture including instructions which can be executed to create means for performing operations specified in the flow charts or block diagrams. Examples of the computer-readable storage medium may include an electronic storage medium, a magnetic storage medium, an optical storage medium, an electromagnetic storage medium, a semiconductor storage medium, etc. More specific examples of the computer-readable storage medium may include a floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disc (DVD), a Blu-ray (registered trademark) disc, a memory stick, an integrated circuit card, etc.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, Java (registered trademark), C++, etc., and conventional procedural programming languages, such as the "C" programming language or similar programming languages.

Computer-readable instructions may be provided to a processor of a general purpose computer, special purpose computer, or other programmable data processing apparatus, or to programmable circuitry, locally or via a local area network (LAN), wide area network (WAN) such as the Internet, etc., so that the processor of the general purpose computer, special purpose computer, or other programmable data processing apparatus, or the programmable circuitry executes the computer-readable instructions to create means for performing operations specified in the flow charts or block diagrams. Examples of processors include computer processors, processing units, microprocessors, digital signal processors, controllers, microcontrollers, etc.

The above embodiments have been described exemplifying the vehicle 200 as an example of the mobile relaying apparatus, but is not limited thereto. An unmanned aircraft etc. like a drone may be adopted as a mobile relaying apparatus.

While the present invention has been described using the embodiments, the technical scope of the invention is not limited to the scope described in the above embodiments. It is apparent to persons skilled in the art that various alterations or improvements can be added to the above-described embodiments. It is also apparent from the description of the claims that the embodiments added with such alterations or improvements can be included in the technical scope of the invention.

Each process of the operations, procedures, steps, stages, and the like performed by an apparatus, system, program, and method shown in the claims, the specification, and drawings can be performed in any order as long as the order is not expressed clearly by "prior to," "before," or the like and as long as the output from a previous process is not used in a later process. Even if the process flow is described using phrases such as "first" or "next" in the claims, the specification, and drawings, it does not necessarily mean that the process must be performed in this order.

EXPLANATION OF REFERENCES

10: communication system, 20: network, 60, 61, 62, 70, 71, 72: intensity, 100: wireless base station, 102: cell, 112: measurement-report receiving unit, 114: command-signal transmitting unit, 116: reporting-information receiving unit, 118: selecting unit, 120: DC controlling unit, 122: moving-speed acquiring unit, 200, 210, 220: vehicle, 202: cell, 300: wireless communication terminal, 400: EPC, 402: MME, 404: SGW, 412: measurement-report receiving unit, 414: command-signal transmitting unit, 416: reporting-information receiving unit, 418: selecting unit, 420: DC controlling unit, 422: moving-speed acquiring unit, 1200: computer, 1210: host controller, 1212: CPU, 1214: RAM, 1216: graphics controller, 1218: display device, 1220: input/output controller, 1222: communication interface, 1224: storage device, 1226: DVD drive, 1227: DVD-ROM, 1230: ROM, 1240: input/output chip

What is claimed is:

1. A control device comprising:
a measurement-report receiving unit configured to receive, from a wireless communication terminal that has established a wireless communication connection with a wireless base station, a measurement report that reports a condition of a radio wave received by the wireless communication terminal from one or more mobile relaying apparatuses;
a command-signal transmitting unit configured to transmit and not to transmit based on two different conditions of the radio wave, the first condition being (i) only one of a plurality of reception-intensities of the radio wave is stronger than a predetermined intensity included in the measurement report, and the second condition being (ii) more than one of the plurality of reception-intensities of the radio wave is stronger than a predetermined intensity included in the measurement report, wherein
under the second condition, a reception-intensity of the radio wave being from a mobile relaying apparatus that is movably camped on a cell of the wireless base station to relay communication between the wireless base station and the wireless communication terminal, the command-signal transmitting unit transmits a command signal, to a plurality of mobile relaying apparatuses whose reception-intensity of the radio wave is stronger than the predetermined intensity, for causing the plurality of mobile relaying apparatuses to report quality information on a communication quality of wireless communication with the wireless base station;
a selecting unit configured to select a secondary cell corresponding to the wireless base station from the plurality of mobile relaying apparatuses, based on reporting information transmitted by the plurality of mobile relaying apparatuses in response to the command signal transmitted by the command-signal transmitting unit to the plurality of mobile relaying apparatuses, wherein
under the first condition, the command-signal transmitting unit does not transmit the command signal, and the selecting unit selects the one mobile relaying apparatus whose reception-intensity of the radio wave is stronger than the predetermined intensity as the secondary cell corresponding to the wireless base station.

2. The control device according to claim 1, wherein the selecting unit selects, from the plurality of mobile relaying apparatuses, the secondary cell corresponding to the wireless base station in a case that the wireless base station provides, as a primary cell, dual connectivity to the wireless communication terminal.

3. The control device according to claim 1, wherein the selecting unit selects, as the secondary cell, a mobile relaying apparatus whose communication quality of wireless communications with the wireless base station is higher than other mobile relaying apparatuses among the plurality of mobile relaying apparatuses.

4. The control device according to claim 3, wherein
the quality information includes information on a reception-intensity of a radio wave from the wireless base station, wherein
the selecting unit selects, as the secondary cell, a mobile relaying apparatus whose reception-intensity of a radio wave from the wireless base station is stronger than other mobile relaying apparatuses among the plurality of mobile relaying apparatuses.

5. The control device according to claim 1, wherein the selecting unit selects, as the secondary cell, a mobile relaying apparatus whose communication quality of wireless communications with the wireless communication terminal is the highest among mobile relaying apparatuses whose communication qualities of wireless communications with the wireless base station are higher than a predetermined quality among the plurality of mobile relaying apparatuses.

6. The control device according to claim 5, wherein
the quality information includes information on a reception-intensity of a radio wave from the wireless base station, wherein
the selecting unit selects, as the secondary cell, a mobile relaying apparatus where reception-intensity of a radio wave from the mobile relaying apparatus at the wireless communication terminal is stronger, in mobile relaying apparatuses whose reception intensities of radio waves from the wireless base station are stronger than a predetermined intensity among the plurality of mobile relaying apparatuses.

7. The control device according to claim 1, wherein the selecting unit selects, as the secondary cell, a mobile relaying apparatus whose moving speed is slower than other mobile relaying apparatuses, in mobile relaying apparatuses whose communication qualities of wireless communications with the wireless base station are higher than a predetermined quality among the plurality of mobile relaying apparatuses.

8. The control device according to claim 7, wherein
the quality information includes information on a reception-intensity of a radio wave from the wireless base station, wherein
the selecting unit selects, as the secondary cell, a mobile relaying apparatus whose moving speed is slower than other mobile relaying apparatuses, in mobile relaying apparatuses whose reception-intensities of radio waves from the wireless base station are stronger than a predetermined intensity among the plurality of mobile relaying apparatuses.

9. The control device according to claim 1, wherein an area in which wireless communications with the wireless base station are enabled is larger than an area in which communications with each of the plurality of mobile relaying apparatuses are enabled.

10. The control device according to claim 1, wherein a radio-frequency band used by each of the plurality of mobile relaying apparatuses for performing wireless communications with the wireless communication terminal is a higher frequency band than a radio-frequency band used by the wireless base station for performing wireless communications with the wireless communication terminal.

11. The control device according to claim 1, wherein a radio-frequency band used by each of the plurality of mobile relaying apparatuses for performing wireless communications with the wireless communication terminal is a lower frequency band than a radio-frequency band used by the wireless base station for performing wireless communications with the wireless communication terminal.

12. The control device according to claim 1, further comprising:
a controlling unit that performs control such that the wireless base station registers, as the secondary cell corresponding to the wireless base station, a mobile relaying apparatus selected as the secondary cell by the selecting unit, in a case that the wireless base station provides, as a primary cell, dual connectivity to the wireless communication terminal.

13. The control device according to claim 1, wherein the plurality of mobile relaying apparatuses are vehicles.

14. The control device according to claim 1, wherein the control device is the wireless base station.

15. A non-transitory computer-readable storage medium comprising a program stored thereon, the program causing a computer to:
receive, from a wireless communication terminal that has established a wireless communication connection with a wireless base station, a measurement report that reports a condition of a radio wave received by the wireless communication terminal from one or more mobile relaying apparatuses,
transmit and not transmit based on two different conditions of the radio wave, the first condition being (i) only one of a plurality of reception-intensities of the radio wave is stronger than a predetermined intensity included in the measurement report, and the second condition being (ii) more than one of the plurality of reception-intensities of the radio wave is stronger than a predetermined intensity included in the measurement report,
wherein under the second condition, a reception-intensity of the radio wave being from a mobile relaying apparatus that is movably camped on a cell of the wireless base station to relay communication between the wireless base station and the wireless communication terminal, transmit a command signal, to a plurality of mobile relaying apparatuses whose reception-intensity of the radio wave is stronger than the predetermined intensity, for causing the plurality of mobile relaying apparatuses to report quality information on a communication quality of wireless communication with the wireless base station;
select a secondary cell corresponding to the wireless base station from the plurality of mobile relaying apparatuses, based on reporting information transmitted by the plurality of mobile relaying apparatuses in response to the command signal transmitted by the command-signal transmitting unit to the plurality of mobile relaying apparatuses,
wherein under the first condition, not transmit the command signal, and select the one mobile relaying apparatus whose reception-intensity of the radio wave is stronger than the predetermined intensity as the secondary cell corresponding to the wireless base station.

16. A control method performed by a computer, the control method comprising:
receive, from a wireless communication terminal that has established a wireless communication connection with a wireless base station, a measurement report that reports a condition of a radio wave received by the wireless communication terminal from one or more mobile relaying apparatuses;
transmit and not transmit based on two different conditions of the radio wave, the first condition being (i) only one of a plurality of reception-intensities of the radio wave is stronger than a predetermined intensity included in the measurement report, and the second condition being (ii) more than one of the plurality of reception-intensities of the radio wave is stronger than a predetermined intensity included in the measurement report,
wherein under the second condition, a reception-intensity of the radio wave being from a mobile relaying apparatus that is movably camped on a cell of the wireless base station to relay communication between the wireless base station and the wireless communication terminal, transmit a command signal, to a plurality of mobile relaying apparatuses whose reception-intensity of the radio wave is stronger than the predetermined intensity, for causing the plurality of mobile relaying apparatuses to report quality information on a communication quality of wireless communication with the wireless base station;

select a secondary cell corresponding to the wireless base station from the plurality of mobile relaying apparatuses, based on reporting information transmitted by the plurality of mobile relaying apparatuses in response to the command signal transmitted by the command-signal transmitting unit to the plurality of mobile relaying apparatuses, wherein under the first condition, not transmit the command signal, and select the one mobile relaying apparatus whose reception-intensity of the radio wave is stronger than the predetermined intensity as the secondary cell corresponding to the wireless base station.

17. The control device of claim 1, wherein the selecting unit selects, from the plurality of mobile relaying apparatuses, the mobile relaying apparatus having the highest communication speed with the wireless base station.

* * * * *